United States Patent [19]

Lindsay

[11] 4,055,229
[45] Oct. 25, 1977

[54] FRAMES FOR MOTORCYCLES

[76] Inventor: James Henry Richard Lindsay, 108, Lower Churchtown Road, Dublin 14, Ireland

[21] Appl. No.: 660,023

[22] Filed: Feb. 20, 1976

[30] Foreign Application Priority Data

Feb. 20, 1975 Ireland .................................. 347/75

[51] Int. Cl.² ............................................ B60K 15/00
[52] U.S. Cl. ...................................... 180/32; 280/284
[58] Field of Search ............... 280/283, 284, 285, 288; 180/32, 33 A

[56] References Cited
U.S. PATENT DOCUMENTS

| 716,604 | 12/1902 | White | 180/32 |
| 3,887,218 | 6/1975 | DiBlasi | 280/284 |

FOREIGN PATENT DOCUMENTS 473,318  7/1952  Italy ..................................... 180/32

Primary Examiner—Philip Goodman
Attorney, Agent, or Firm—Young & Thompson

[57] ABSTRACT

The invention concerns a motorcycle in which the engine is mounted on the swinging arm to provide a rigid connection between the engine drive and the rear wheel hub. The swinging arm is pivoted to the motorcycle frame forwardly of the engine.

2 Claims, 3 Drawing Figures

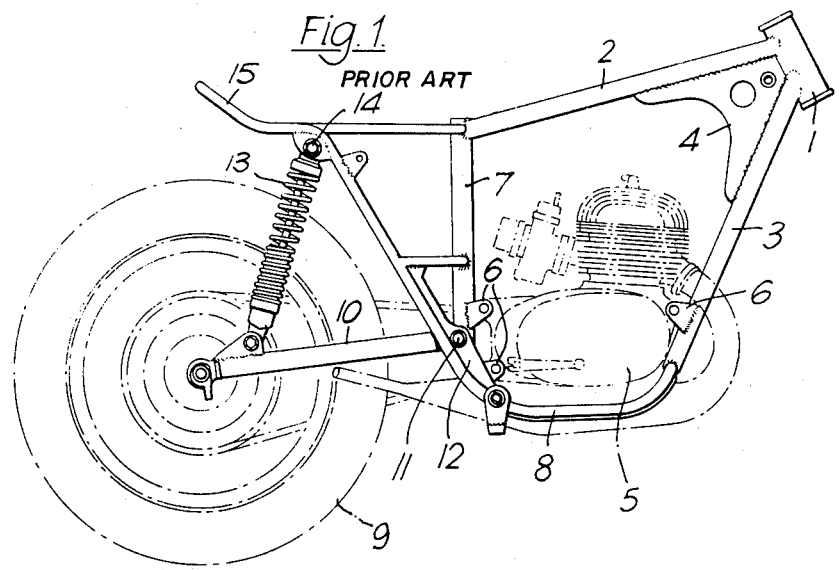
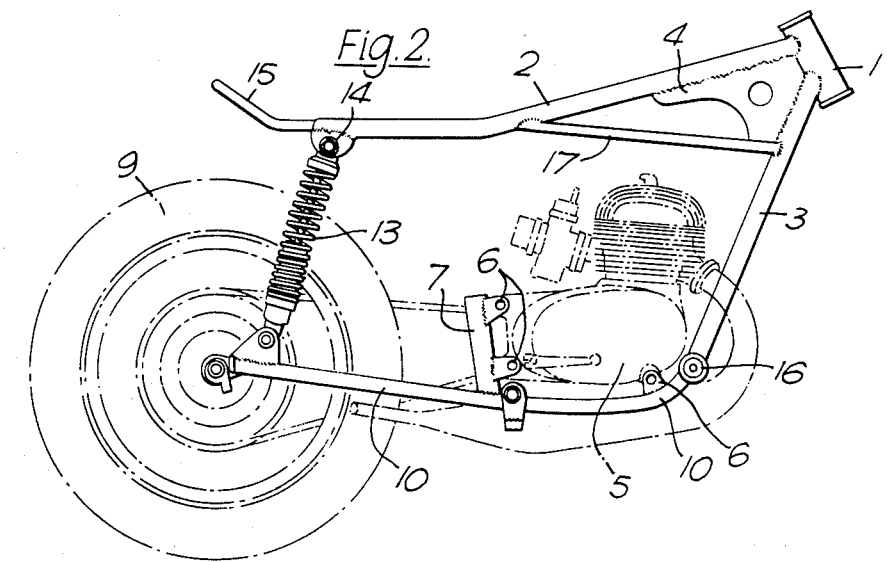

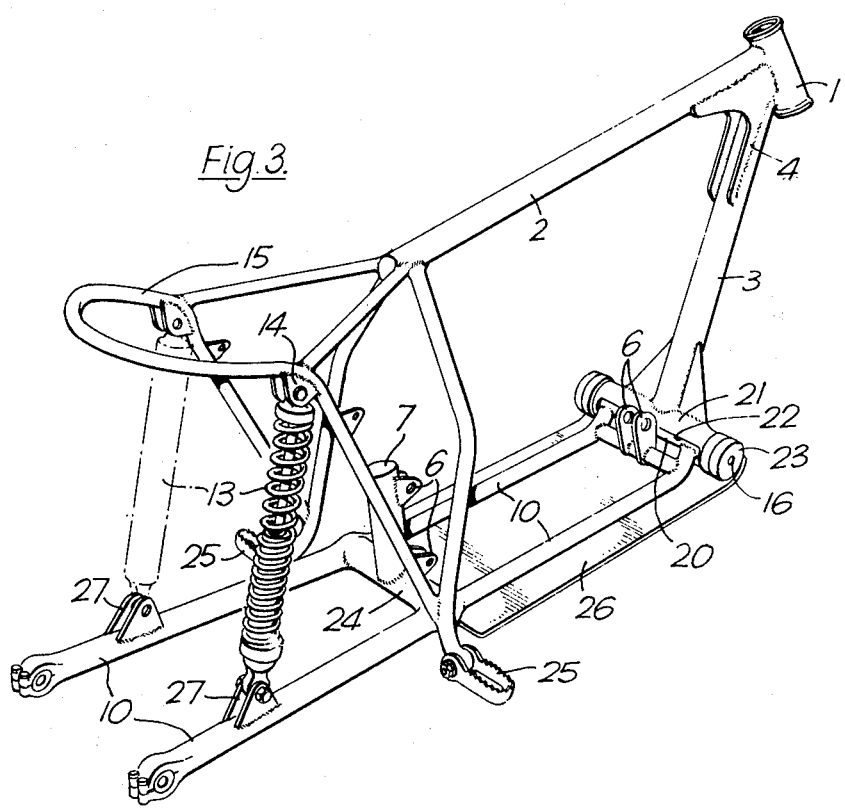

FRAMES FOR MOTORCYCLES

The invention relates to frames for motorcycles and in particular frames for motorcycles of the kind used in off-the-road motorcycle sports (hereinafter referred to as a "trials motorcycle").

In the conventional trials motorcycle the rear wheel is mounted between the ends of a forked swinging arm which is pivoted to the main frame portion rearwardly of the engine. The rear suspension of the motorcycle is comprised of a pair of shock absorbers each connected at one end to the end of the swinging arm adjacent the hub, and at the other end to a mounting located beneath the saddle of the motorcycle. It has been found with this arrangement that when the engine throttle is opened suddenly the rear wheel tends to lift from the ground with a resultant loss in traction. This would appear to result from the fact that the sudden drive from the gear-box sprocket through the chain drive to the rear wheel sprocket imparts a turning moment to the swinging arm about its pivoted connection to the main frame.

It is an object of the invention to overcome this disadvantage and to provide a motorcycle frame having a rigid relationship between the gear-box sprocket on the engine and the rear wheel.

Accordingly, the invention provides a frame for a motorcycle having a forked swinging arm pivotally connected to the main frame portion wherein the swinging arm is provided with mountings for the motorcycle engine and is adapted to carry the engine. The swinging is be pivotally connected The invention will now be described with reference to the accompanying drawings wherein:

FIG. 1 is an elevation of a conventional frame for a trials motorcycle with the outline of the engine and rear wheels shown in broken lines;

FIG. 2 is an elevation of a frame according to the invention, and

FIG. 3 is a perspetive view thereof.

Referring firstly to FIG. 1, this shows a conventional frame of a trials motorcycle, which comprises a socket 1 for mounting the front suspension. The socket 1 is supported by frame members 2 and 3 which are connected by webbing 4. The engine 5 is mounted by brackets 6 between the frame members 3 and a stanchion 7 which is positioned between a lower frame member 8 and the upper frame member 2. The rear wheel 9 is carried between the ends of a forked swinging arm 10 which is pivotally connected at 11 to a bracket 12 on the frame member 8. The rear suspension comprises a pair of shock absorbers 13 connected between the ends of the swinging arm 10, adjacent the rear wheel hub, and pivotal mountings 14 located adjacent the saddle support 15.

It will be appreciated that in this construction the swinging arm 10 may move independently of the engine 5 and so when the engine is accelerated rapidly the drive chain causes the swinging arm to rise thus lifting the rear wheel 9 from the ground and losing adhesion.

In the embodiment of the invention shown in FIG. 2 the lower frame member 8 is dispensed with and the swinging arm 10 is extended in length and is pivoted at 16 to the front frame member 3. The engine 5 is mounted on the swinging arm 10 by means of brackets 6. A brace member 17 is provided between the frame members 2 and 3 to give rigidity to the structure. It will be appreciated that in this construction there is a rigid relationship between the gear-box sprocket of the engine and the rear wheel nd so the swinging arm 10 will not lift when the engine is accelerated rapidly.

It will also be appreciated that instead of having a curved swinging arm 10 as shown in FIG. 2 the swinging arm can be substantially straight and the engine slung between the forked portions thereof.

In the preferred embodiment shown in FIG. 3, the forward ends of the fork swinging arm 10 are formed with a tubular bearing member 20 which extends laterally of the swinging arm 10 and is disposed normal to the longitudinal axis of the swinging arm. The tubular bearing member 20 is rotatably mounted within a tubular housing 21 which is welded at the centre portion to, and extends transversely of, the lower end of the front frame member 3. The tubular housing 21 is formed with openings 22 through which the ends of the forked swinging arm 10 enter the housing. The open ends of the tubular bearing member 20 receive adjustable tapered roller bearings 23 such that the swinging arm 10 may pivot about the axis 16. If desired, the single front frame member 3 can be replaced by a pair of parallel frame members each of which is connected to the tubular housing 21 adjacent one of the roller bearings 23. In this way any transverse movement of the rear ends of the swinging arm 10 is minimised.

The forked portions of the swinging arm 10 are connected together midway of their length by a transverse tubular portion 24 which imparts rigidity to the swinging arm. The tubular portion 24 also serves to support a stachion 7, which carries an engine mounting bracket 6. A second engine mounting bracket 6 is located on the swinging arm adjacent the bearing member 20 and the engine (not shown) is mounted between these two brackets.

A foot rest 25 is carried by the tubular portion 24 at each side of the swinging arm (for the sake of clarity only one foot rest 25 is shown in the drawing). A sump shield 26 is mounted beneath the forward portion of the swinging arm 10. The rear wheel (not shown) is carried between the rear ends of the forked swinging arm 10 by means of an eccentrically disposed push-through axle. The shock absorbers 13 are connected between pivoted mountings 14 located on the saddle support 15 and bracket 27 is mounted on the swinging arm 10 adjacent the rear wheel hub.

I claim:

1. A trials motorcycle for use in off-the-road motorcycle sports having a frame comprising a top frame member, a saddle support mounted at the rearward end of said top frame member, an upwardly inclined front frame member connected at an upper end thereof to the forward end of said upper frame member, and a steering head mounted on said connecting ends of said top and front frame members; a forked swinging arm pivotally connected by pivot means at a forward end thereof to the lower end of said front frame member, said forked swinging arm extending rearwardly from the motorcycle frame, a rear wheel carried between the rear ends of the fork of said swinging arm, shock absorbing means connecting said rear ends of said swinging arm and top frame members, an engine mounted on said swinging arm forwardly of said saddle support and directly behind said front frame member and said pivot means, and a drive chain connected between power output means on the engine and said rear wheel.

2. A motorcycle frame according to claim 1, wherein the forward end of the swinging arm is formed with a tubular bearing member disposed normal to the longitudinal axis of the swinging arm, said bearing member being rotatably mounted within a tubular housing fixed to said front frame member.

* * * * *